United States Patent [19]

Gillen et al.

[11] Patent Number: 5,505,023
[45] Date of Patent: Apr. 9, 1996

[54] SLIDE GLASS MECHANISM AND SEAL SYSTEM FOR VEHICULAR BACKLITE

[75] Inventors: John H. Gillen, Ottawa Lake, Mich.; Gary W. Bernier, Waterville, Ohio

[73] Assignee: Libbey-Owens-Ford Co., Toledo, Ohio

[21] Appl. No.: 277,190

[22] Filed: Jul. 19, 1994

[51] Int. Cl.$^6$ .................................................. E06B 1/00
[52] U.S. Cl. .............................. 49/380; 49/209; 49/408; 49/413; 49/415; 49/449
[58] Field of Search ............................ 49/380, 209, 413, 49/415, 408, 449; 296/146.16; 52/207, 208

[56] References Cited

U.S. PATENT DOCUMENTS

| | | |
|---|---|---|
| 4,561,625 | 12/1985 | Weaver . |
| 4,662,113 | 5/1987 | Weaver . |
| 4,755,339 | 7/1988 | Reilly et al. . |
| 4,785,583 | 11/1988 | Kawagoe et al. ............... 49/408 X |
| 4,788,796 | 12/1988 | Matthews ....................... 49/408 X |
| 4,839,122 | 6/1989 | Weaver . |
| 4,951,927 | 8/1990 | Johnston et al. . |
| 4,996,808 | 3/1991 | Weaver . |
| 5,060,440 | 10/1991 | Weaver . |
| 5,294,168 | 3/1994 | Kronbetter . |
| 5,345,717 | 9/1994 | Mori et al. ..................... 49/413 X |

Primary Examiner—Philip C. Kannan
Attorney, Agent, or Firm—Marshall & Melhorn

[57] ABSTRACT

A window frame assembly is provided with a sliding glass mechanism and seal system for vehicular backlites. The assembly includes a pair of fixed side windows secured in a frame in spaced-apart relationship, and one or more sliding windows positioned in channel brackets to close and open the aperture between the fixed window panes. A single gasket formed by a reaction injection molding process is formed around the periphery of the window assembly for mounting the window assembly in the opening of a body panel of a pickup truck. The gasket is integrally formed about the aperture during the reaction injection molding process and includes a flexible lip to engage the sliding window. The sliding window slides in the channels of the channel brackets and is positioned to engage the lip of the gasket to seal the aperture. The required sliding force to open and close the sliding window may be reduced by spring loading the sliding window in the channel. Channel guides with a spring mechanism are placed on the top and bottom edges of the sliding glass. A cam formed in the channel bracket is used to compress the springs and force the sliding glass window against the lip of the gasket to sealingly close the aperture. When the sliding window is in the range of open positions, the spring mechanism clears the cam and forces the sliding window away from the lip of the gasket to facilitate sliding of the glass.

18 Claims, 5 Drawing Sheets

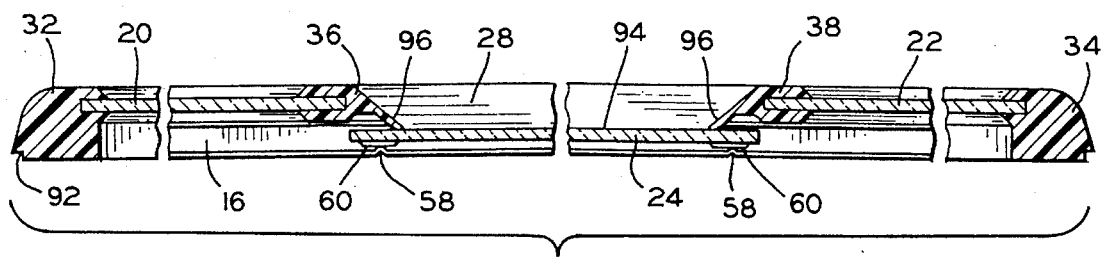
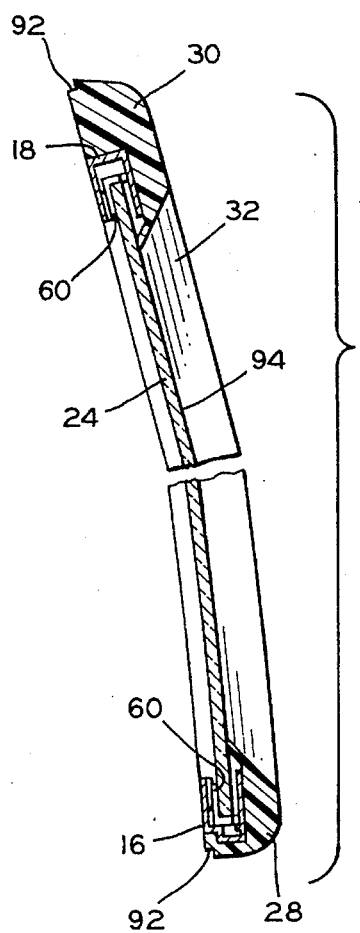
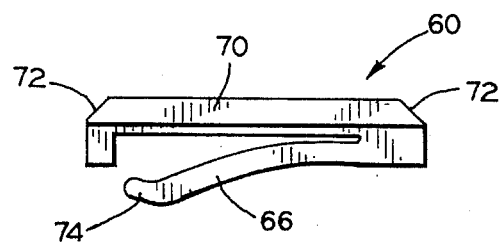
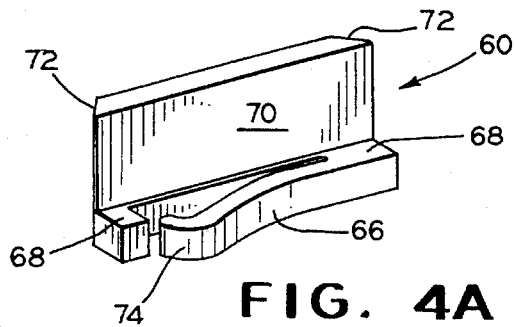
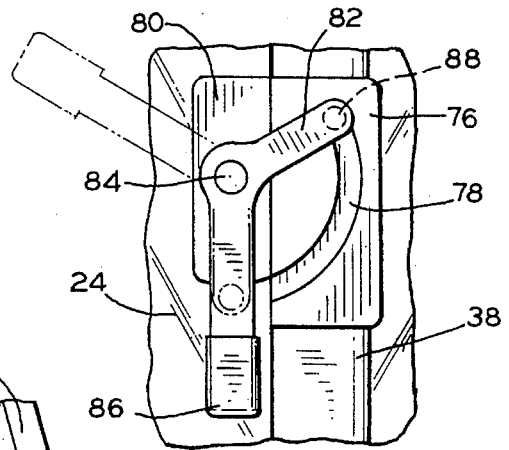
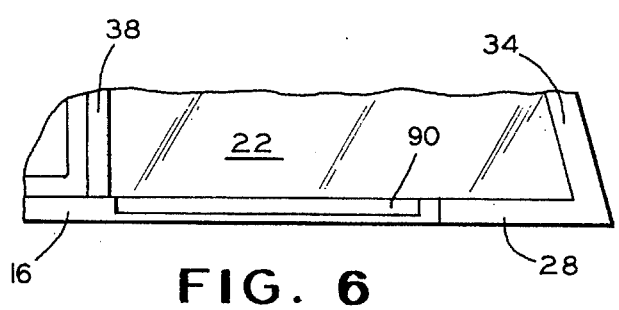

SLIDE GLASS MECHANISM AND SEAL SYSTEM FOR VEHICULAR BACKLITE

BACKGROUND OF THE INVENTION

1. Field of the Invention

The present invention relates to window frame assemblies, and in particular, to an assembly having a sliding glass mechanism and seal system for vehicular backlites. The assembly includes a frame for mounting the assembly in a vehicle, a pair of fixed side window panes secured in the frame, and one or more sliding window panes slidingly positioned between the fixed window panes.

2. Summary of Related Art

Pickup trucks and other related vehicles have a rear window, or backlite, that is mounted in an opening in the body panel immediately behind the seats in the passenger compartment. The backlites are supplied to the pickup truck manufactures as window frame assemblies for installation on the assembly line. The backlite assemblies typically include a metal frame, such as aluminum, provided with a top and bottom channels to facilitate the sliding of the glass panels.

The backlite assembly is mounted directly into the window opening in the body panel. The assembly is secured to the body panel with adhesives and/or mechanical fastener devices. A urethane adhesive is frequently used in the backlite applications, such adhesive being applied to the mounting surface of either the opening in the body panel or the backlite assembly prior to the moment at which these two structures are brought into abutment.

The backlite assembly in a pickup truck can be a source of problems, such as water leakage. The leakage may occur at the engagement of the backlite assembly and the body panel, which is typically caused by improper adhesive application or frame distortion. Water leakage may also occur around the seal extending about the four edges of the aperture in a sliding window. Two edges of the aperture are formed by the top and bottom channel. The other two edges are formed by the internal edges of the fixed, side windows (or a pillar mounted thereon). A tight seal is required on all four edges of the sliding window to ensure the integrity of the seal.

The primary configuration currently used in the backlite assemblies consists of an assembly having a metal bracket with two channels extending around the complete perimeter of the assembly. The two fixed windows are mounted in an outer channel in planar, spaced-apart relationship with two horizontal and two vertical seals secured in the outer channel surrounding the opening between the fixed windows. The sliding window is disposed in the inner channel, adjacent the fixed windows. In the closed position, the sliding window sealably engages the seals to seal the opening between the fixed windows. When moved to an open position, the sliding window slides in the internal channel to overlap one of the fixed windows in the outer channel.

The seals are made from rubber or other equivalent material and include an extended lip which flexibly engages the sliding window to prevent water and dirt from entering around the sliding window. The rubber seals are mounted in the outer channel between the two fixed windows. The rubber seals facilitate the sliding of the sliding window in a horizontal direction while maintaining sufficient pressure at the lip of the seal to prevent water from leaking around the seal to the interior of the assembly and the pickup truck.

The rubber seals require a manual production step to properly install the seals around the opening of the assembly. One of the needs of the window manufacturers is to find an alternative sealing system which seals the opening without discrete rubber seals, thereby reducing material and labor costs during production operations and while improving the integrity of the seal around the sliding window.

Although rubber seals are expensive and difficult to install, such rubber seals may still be required or preferred in certain embodiments. If the rubber seals are not installed properly, then water leakage may occur in the horizontal channels or along the vertical edges of the aperture. An improved method, such as encapsulation, for securing the rubber seal about the aperture in the backlite is also desired in the industry.

In addition to the sealing problem noted above, there are several additional performance requirements which often present problems in the use of the sliding window assemblies in pickup trucks. In the closed position, the backlite window assembly must maintain the wind and road noise within acceptable limits. The seal must uniformly seal the sliding window to eliminate outside noise. The channel drain holes and other design features must be designed to eliminate road noise problems.

High or variable sliding force is another concern in backlite window assemblies. The sliding window typically includes rubber or plastic guides to secure the slidable window within the bottom internal channel. The slidable window should slide freely within the guides while still being positioned to sealably engage the lip of the rubber sealing member. If the seals are installed improperly, such as misalignment, then the sliding window may difficult to slide. The channels of the frame may also be misaligned. The sliding characteristics of the rubber seals and the channel guides should permit the sliding of the sliding window while maintaining the necessary seal force between the sliding window and the seal.

Another problem which frequently occurs with backlite assemblies is a sliding glass rattle. When the sliding glass is moved to an open position, the sliding glass in the internal channel must be retained by channel guides in order to prevent a rattle of the glass.

In summary, a backlite assembly with one or two sliding windows must maintain a proper seal to eliminate water leaks and wind/road noise in a closed position. The slidable windows, without compromising the required seal, must be easy to slide to facilitate the opening and closing of the backlite sliding window. In the open position, the sliding window must be secured in the channel to prevent a rattle of the glass.

In a backlite assembly, the required features include a tight seal and, conversely, easy sliding movement. Adhesives are used to secure the backlite assembly in the pickup truck and to secure the rubber seals and the guides in the assembly. Slip coats and other lubricants are often used to facilitate the sliding of the sliding glass against the seal and the guide walls. Applying adhesives and lubricants in such proximity on the same assembly adds to the production costs and could cause quality problems if either is applied improperly.

A window frame assembly for pickup truck backlites is disclosed in U.S. Pat. No. 5,294,168 to Kronbetter. The Kronbetter window assembly includes a complex top and bottom rail with two channels, an outer channel for mounting the two outer pieces of fixed glass and the rubber sealing members, and an inner channel for securing the guides and the sliding windows.

In Kronbetter, the assembly of the window frame starts with the insertion of the guides into the inner channels. Adhesive is applied to the outer channel to secure the fixed window panes in the frame. The sliding window panes are inserted into the guides and the bottom metal frame segment and the bowed, top metal frame segment are welded or otherwise bonded together. The sealing members are then placed in the outer channel of the frame to slidably and sealably engage the sliding windows in the inner channel. The window frame assembly is then ready for installation into a pickup truck.

The metal frame of the window assembly in Kronbetter is expensive to manufacture and assemble. Pickup truck manufacturers desire a less expensive window assembly that is easier to mount and still meets all of the performance requirements.

In recent years, motor vehicle glass suppliers have been supplying to motor vehicle manufactures, modular windows having urethane gaskets molded in situ by means of a reaction injection molding (RIM) encapsulation process. These gaskets encapsulate the peripheral edge of the glass window and provide an effective seal between the glass and the window opening in the metal automobile body. The gasket is formed by inserting a glass sheet in a suitable mold and injecting a liquid, plastic forming composition about the periphery thereof which polymerizes and cures in contact with the glass and tightly adheres thereto.

Prior to the development of the reaction injection molding process, vehicle window assemblies were comprised of a plurality of elements, including adhesive sealants applied around the marginal edges of the glass sheet, suitable mechanical fasteners such as metal clips, and exterior decorative trim strips disposed to cover the junction between the marginal edges of the glass sheet and the adjacent portion of the vehicle frame. These structures were costly in both material and labor, and were very difficult (if not impossible) to install using robotics. In order to install the windows using robotics, it was necessary that the windows have a gasket formed around the perimeter thereof.

The initial vehicular window gaskets were formed from a molded plastic material, such as polyvinyl chloride. The relatively high pressure required for the PVC injection molding process, however, resulted in glass breakage and other production related problems. The PVC window assembly process is described in U.S. Pat. No. 4,072,340 to Morgan.

In the 1980's, the reaction injection molding encapsulation process was developed to produce modular windows which would reduce glass breakage and facilitate the installation of motor vehicle windows by robots. U.S. Pat. No. 4,561,625 to Weaver describes the use of polyurethane molded on the peripheral edges of the glass at low pressures through the use of a RIM technique. The polyurethane gasket was of great significance since it eliminated the need for the conventional adhesive sealants, ancillary metal clips and exterior decorative trim strips disposed to cover the junction between the marginal edges of the glass sheet and the adjacent portions of the vehicle frame. The RIM encapsulated gasket worked better than the polyvinyl chloride gasket which was then being contemplated for use, in that the RIM method of forming the gasket permitted it to be done at lower pressures and accordingly substantially reduced the incidents of breakage of the glass.

U.S. Pat. No. 4,755,339 to Reilly et al. and U.S. Pat. No. 4,839,122 to Weaver disclose further details regarding the method and apparatus for reaction injection molding of window gaskets.

Metal brackets and spacers have been incorporated into the reaction injection molding process to improve the functionality of the glass. U.S. Pat. No. 4,662,113 to Weaver shows a window assembly used for door windows on motor vehicles which is operated in a vertical manner. A bracket is placed in the mold with the window glass and is integrally secured to the window glass during the formation of the gasket by the rim injection molding process. The bracket provides a means to connect a linkage or other drive means to the window glass to raise and lower the window in the motor vehicle.

U.S. Pat. No. 4,951,927 to Johnston et al. shows a spacer element used to maintain spacing between two sheets of glass. The spacer is positioned about the periphery of the sheets of glazed glass prior to positioning the glass in a mold for reaction injection molding to form an encapsulating gasket around the peripheral edge portions to produce a multiple glazed structure.

Because of the desirable features of the gaskets formed by reaction injection molding, the process has been used for several additional applications. U.S. Pat. No. 5,060,440 to Weaver discloses two glass sheets flexibly connected by adjacent gaskets joined during the reaction injection molding process. U.S. Pat. No. 4,996,808 to Weaver discloses an encapsulated window assembly in which a preformed sheet of plastic material is place in the mold prior to the gasket forming process.

SUMMARY OF THE INVENTION

In accordance with the present invention, there is provided a window frame assembly provided with a sliding glass mechanism and seal system for vehicular backlites. The assembly includes a pair of fixed side window panes secured between two brackets in parallel, spaced-apart relationship, and one or more sliding windows slidingly positioned in the bracket channels to close and open the aperture between the fixed window panes.

The window frame assembly includes a pair of linear channel brackets which form the top and the bottom of the assembly. The fixed side windows, two generally rectangular pieces of glass, are secured to the outer faces of the channel brackets by a reaction injection molding process, which forms a polyurethane gasket on the periphery of the total assembly. The fixed side windows are spaced apart to define an aperture which is opened and closed by a sliding window. The channels in the top and bottom channel brackets are inwardly facing channels for securing the sliding window.

The polyurethane gasket formed around the periphery is used for mounting the window assembly in the opening in the body panel of the pickup truck. The gasket provides a flush surface for improved sealing of the opening in the body panel.

During the reaction injection molding process, a single gasket is formed around the periphery of the window assembly plus on the two vertical internal edges of the fixed side window glass. Consequently, the aperture between the two fixed pieces of glass has a unitary, RIM encapsulated gasket on all four sides of the aperture. The single gasket includes horizontal gasket segments formed on the top and bottom channel brackets and the vertical gasket segments formed on the internal vertical edges of the fixed side window glass to define an aperture.

The gaskets about the aperture are formed with a flexible lip to sealably engage the sliding window, which may eliminate the need for a separate rubber sealing member. The sliding window slides in the channels of the channel brackets and is positioned to the lips of the gasket to seal the aperture. If sufficient force can be maintained by the sliding glass on the lip of the channel, the need for an internal rubber sealing member is eliminated. The elimination of the sealing member, which is relatively expensive to make and install, is of significant benefit to window assembly manufacturers.

However, the application of sufficient force to provide a sealed engagement generally restricts the sliding motion of the sliding window in the channels. The required sliding force may be reduced by applying a lubricant on the lip of the urethane gasket or by coating the edges of the sliding window.

An additional means for reducing the sliding force is to spring load the sliding glass window in the top and bottom channel. A spring loaded glass guide may be place on the corners of the top and bottom edges of the sliding window. The spring arm of the guide forces the sliding window away from the lip of the gasket when the window is in the range of open positions to facilitate sliding of the glass. A cam formed in the channel bracket or other similar mechanism may be used to compress the springs and force the sliding glass window against the lip of the gasket to sealingly close the aperture in the closed position.

An object of the present invention is to eliminate the requirements for a discrete sealing member to be mounted about the aperture in the window assembly to prevent water leaks. The lip of the outer seal around the periphery of the assembly can be designed to sealably engage the slider window without the sealing member, thereby reducing the cost of the window assembly.

In circumstances where a discrete sealing member is still required, the sealing member may be secured around the aperture of the backlite assembly by the gasket formed during the reaction injection molding process. The lip for sealably engaging the sliding window is formed in the sealing member. The polyurethane gasket secures and seals the fixed side windows, the brackets and the rubber seal to form an window assembly in a single reaction injection molding process.

An object of the present invention is to simplify the production process and improve the seal quality in a backlite assembly. The gasket formed during the reaction injection molding process secures the component parts in the desired position and forms the seal around the aperture of the backlite. In an alternative embodiment, the gasket secures a discrete sealing member about such aperture. In either embodiment, the seal about the aperture is improved by the gasket, which can be formed in a single reaction injection molding process step.

A further object of the present invention is to simplify the metal frame required for the backlite window assembly and to minimize the assembly costs. By using reaction injection molding to form a gasket around the periphery for mounting the window assembly in a body panel, the need for a metal frame is eliminated except to provide a frame to connect the two fixed pieces of window glass, and to provide a channel for positioning the sliding glass window. A "U" or "L" shaped channel bracket extending between the top and bottom edges of the fixed glass windows along the horizontal path of the sliding window is the primary requirement.

An additional object of the present invention is to provide a sliding mechanism which makes the sliding window relatively easy to slide and which does not rattle when the window of the backlite window assembly is open. Mounting the sliding window in the channel with spring loaded glass guides separates the sliding window from the gasket in the open position, and a cam device causes the sliding window to sealingly engage the gaskets in the closed position.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4 is a top view and FIG. 4A is a perspective view of the sliding window guides with a spring portion formed on the guides;

FIG. 5 is a front elevational view of the handle mechanism used to open, close, and slide the sliding window;

FIG. 6 shows a slot in the bottom bracket for inserting the sliding window into the channel of the bracket;

FIG. 7 is an enlarged fragmentary sectional top view of the window assembly in FIG. 1 taken along the line 7—7 thereof;

FIG. 8 is an enlarged fragmentary sectional side view of the window assembly in FIG. 1 taken along the line 8—8 thereof;

DESCRIPTION OF THE PREFERRED EMBODIMENT

Figure 1:
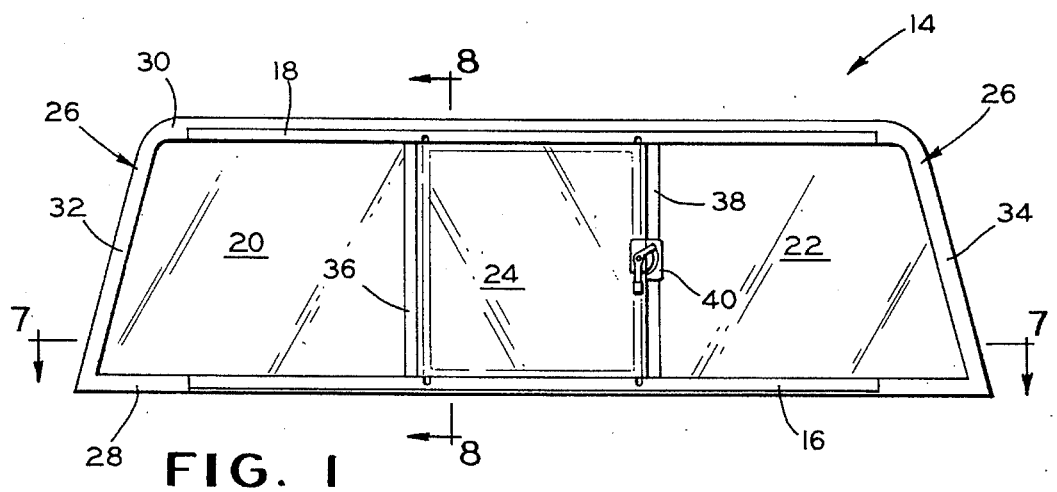
FIG. 1 is a front elevational view of the backlite window assembly for a motor vehicle, such as a pickup truck, as viewing the window assembly from inside the pickup truck.

Referring now to FIG. 1, there is shown a backlite window assembly 14 according to the present invention, ready for installation into an opening in a body panel of a motor vehicle, such as a pickup truck. The backlite window assembly 14 includes a bottom channel bracket 16, a top channel bracket 18, a pair of laterally spaced, fixed windows 20, 22 and a single sliding window 24. With a single sliding window 24, a side latching mechanism 40 is used. In the alternative, a pair of sliding windows with a center latching mechanism can be used in the backlite window assembly 14.

The backlite window assembly 14 also includes a single gasket 26 formed by a reaction injection molding encapsulation process as disclosed in U.S. Pat. Nos. 4,561,625; 4,755,339; and 4,839,122, which are incorporated herein by reference. The single gasket 26 extends about the periphery of the assembly and includes bottom and top segments 28, 30 and side segments 32, 34. In addition, the single gasket 26 includes the two internal vertical segments 36, 38, all of the segments simultaneously and integrally formed during the reaction injection molding process of fixed glass windows 20, 22.

Figure 2:
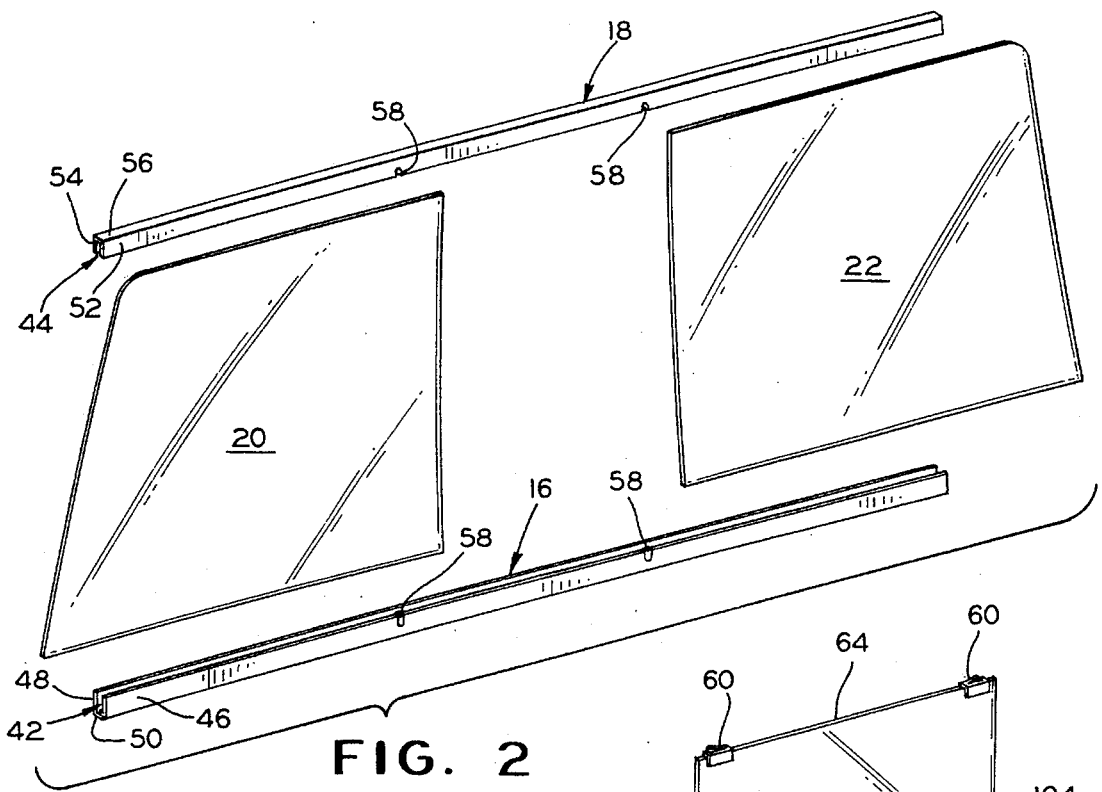
FIG. 2 is a perspective view of the top and bottom channel brackets and the fixed side pieces of glass prior to being placed in a mold for reaction injection molding of the urethane gasket around the periphery of the such parts.

In general, the reaction injection molding process includes placing the individual components in FIG. 2 into a mold (not shown). When the mold is in the open position, the two fixed glass windows 20 and 22 are positioned on the lower section of the mold. The bottom and top brackets 16, 18 are then positioned in the lower section of the mold. Seals are placed throughout the molds in a known manner such that the seals cooperate with selected portions of the fixed glass windows 20, 22; the brackets 16, 18; and the mold sections to define the gasket forming cavities. The cavities communicate with an inlet means or gate for receiving a flowable polymeric gasket forming material from a nozzle member. The gasket forming material is adapted to polymerize and cure in situ on the peripheral portions of the fixed glass windows 20, 22 and the brackets 16, 18. The gasket may be formed by a reaction injection molding process using an elastomeric material such as polyurethane, for example.

The brackets 16, 18 are positioned in spaced apart relationship with the inner surface of the horizontal edges of the fixed windows 20, 22 and secured thereto by the gasket segments 28, 30. In the present application, "inner" surface refers to the surface of the window or bracket facing the inside of the vehicle after the backlite window assembly 14 has been mounted in a body panel. Conversely, the "outer" surface refers to the surface facing the outside of the vehicle after installation.

After completion of the reaction injection molding encapsulation process, the window assembly 14 is ready for insertion of the sliding glass 24 with handle mechanism 40, and installation of the completed window assembly 14 into the body panel of a vehicle. The reaction injection molding process results in a integral molding along all peripheral edges. The molded corners of the window assembly provide a better seal than the overlap corners used in backlite assemblies in the prior art.

The fixed windows 20, 22 and the sliding window 24 are standard automotive type glass with optional tinting and other sun screen capabilities. The brackets 16, 18 are generally U-shaped in configuration with the open sides of the channels 42, 44 facing each other for acceptance of the sliding glass 24. The channel 42 for bracket 16 is formed by inner and outer side walls 46, 48 and bottom segment 50.

The channel 44 for bracket 18 includes inner and outer side walls 52, 54 and top segment 56. Identical cams 58 are formed in the inner side walls 46, 52 of the brackets 16, 18.

Figure 3:
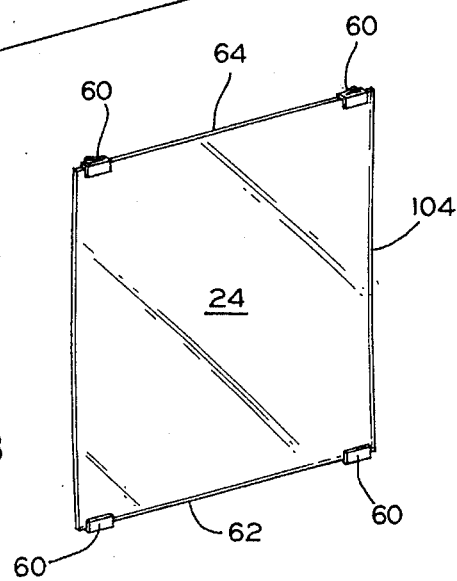
FIG. 3 is a perspective view of the piece of sliding glass with guides mounted on the top and bottom corners, prior to insertion into the channels of the brackets.

FIGS. 3, 4, and 4A show the sliding glass window 24 and the guides 60 secured to the bottom and top edges 62, 64 of the sliding glass window 24. The guides 60 include a flexible spring arm 66, a base 68, and a vertical actuator surface 70 with tapered edges 72. The guides 60 are made from a polymer material with sufficient resiliency to maintain the necessary spring force.

When positioned in channels 42, 44, the spring arm 66 of the guides is partially compressed to ensure the proper tension engagement in the channels 42, 44. The spring arm 66 engages the outer side wall 48, 54, and the actuator surface 70 engages the inner side walls 46, 52 of the brackets 16, 18. The spring arm 66 has a rounded head 74 to facilitate the sliding movement in the channels 42, 44.

The guides 60 are positioned such that the actuator surfaces 70 engage the cams 58 when the window 24 is in a closed position. The spring arm 66 is fully compressed in the closed position and the slidable window engages the segments 28, 30, 36, 38 of gasket 26 with sufficient force to form a seal around all four edges of the slidable window 24. When the sliding window 24 is moved to an open position, the spring arm 66 is only partially compressed. The force of the spring arm 66 expanding from a fully compressed position in the channels 42, 44 provides sufficient force to move the sliding glass window 24 away from the gaskets to permit improved sliding of the window 24. The force of the partially compressed spring arm 66, however, is still sufficient to hold the window 24 in tension to eliminate rattles caused by vibrational movement of the sliding window 24.

The bottom and top edges 62, 64 of the sliding window 24 may include two or more guides 60 in spaced-apart relationship on each edge. The guide may also be formed in an elongate fashion such that only a single guide may be used to facilitate the movement of a sliding window 24.

In the closed position, when the actuator surfaces 70 of the guides 60 engages the cams 58, the sliding window 24 is compressed against the gasket segments as noted above. The polyurethane gasket 26 restricts the movement of the sliding glass window 24 such that up to 20 pounds of force may be needed to move the sliding glass window 24 the final distance to close the sliding window 24. In an effort to reduce the closing force required to slide the window 24 to a fully closed position, the handle mechanism 40 is designed to provide additional leverage to close the window 24.

The handle mechanism 40 includes a fixed base 76 attached to the vertical gasket 38. The fixed base 76 is provided with a groove 78 formed in the base 76 which extends into sliding base 80. The sliding base 80 is provided with an angle arm 82 pivotably connected to the base 80 at pivot point 84. Rotating the handle 86 about the pivot point 84 causes the tracking head 88 to move from a locked, close position to an open position and vice versa. The handle mechanism 40 provides the additional leverage needed to overcome the closing force of the window 24 when the actuator surfaces 70 of the guides 60 engages the cams 58 in the closed position.

Other styles and configurations of handle mechanisms 40 may be used if sufficient force is generated to close the sliding glass window 24. In addition, other styles and configurations of guides 60 may be used to create the proper forces to seal the edges of window 24 in the closed position, and to force the window 24 away from the gaskets 28, 30, 36, 38 for improved sliding of the window 24 while maintaining the desired stability in the channels 42, 44.

After the reaction injection molding process is complete, the sliding glass window 24 with guides 60 must be positioned between the bottom bracket 16 and the top bracket 18. The sliding window 24 may be positioned between the brackets 16 and 18 in the RIM molds such that no gasket forming material is deposited and cured on the sliding window 24. Another means of installing the sliding glass window would be to temporarily flex open the inner side walls 46 and 52 of the brackets 16 and 18 and to wedge the sliding glass window 24 in place. FIG. 6 shows a gap 90 formed in bracket 16 by removing a segment of the inner side wall 46. The window 24 may be inserted into the brackets 16, 18 at the gap 90 and slid into position. The sliding glass window 24 may also be installed from one end of the brackets 16, 18 by temporarily removing gasket 34 from the ends of the brackets 16, 18 to facilitate the insertion of the sliding glass window 24.

The completed window assembly 14 is shown in greater detain in FIGS. 7–10. The gasket 26 includes a notch 92 on the inner edge of the gasket 26 for seating the assembly 14 in a side panel of a pickup truck (not shown). The outer surface 94 of the sliding window 24 engages the tip 98 of lip 96 formed in gasket 26 about the aperture between the fixed windows 20, 22. The lip 96 is formed on all four sides of the aperture and provides an excellent means for sealing the aperture so long as the force of the sliding window 24 is sufficient to sealing engage lip 96. The gasket 26 may have different body configurations in various segments, such as the bottom gasket segment 28 shown in FIG. 10 and the top gasket segment 30 shown in FIG. 9. However, the lip 96 provides the same sealing affect around the periphery of the aperture between the two fixed windows 20, 22.

The lip 96 is integrally formed with the gasket 26 during a single reaction injection molding process. The lip 96 is formed on the full length of the vertical gasket segments 36, 38 and on the center portions of horizontal gasket segments 28, 30. Because no separate sealing pieces are required to be inserted in an additional channel and sealed in such channel, the integrity of the seal in the present invention is superior to seals in the prior art. In addition, the labor and material needed to provide an acceptable seal is substantially reduced.

In FIG. 7, the positioning and relationship of the cams 58 and the guides 60 are shown. The cams 58 urge the sliding glass 24 toward the lip 96 to completely seal the aperture between the fixed windows 20, 22. The lip 96 is formed from an elastomeric material which has sufficient flexibility and resiliency to exert a pressure to seal the perimeter of the aperture without breaking the sliding window 24, and to maintain the desired seal over an extended period of operation.

Figure 9:
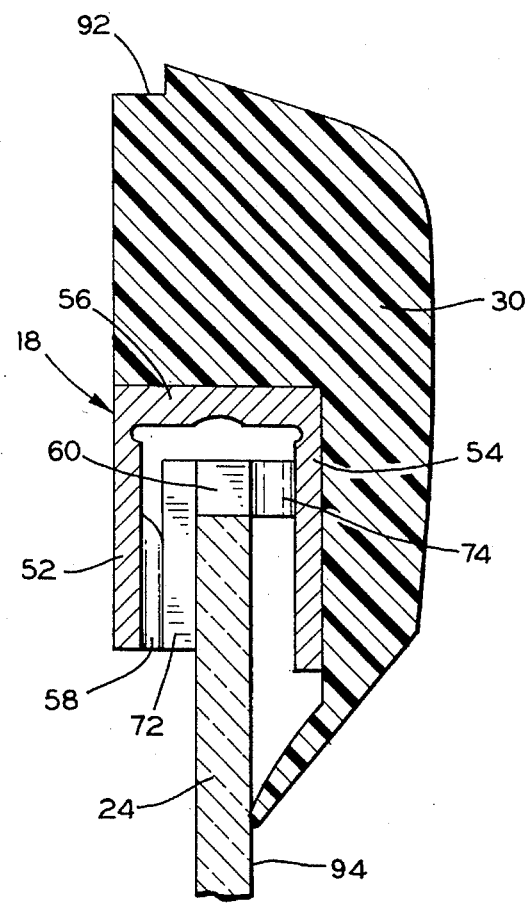
FIG. 9 is an enlarged sectional side view of the top bracket showing the gasket, sliding window, and window guide in the closed position.
Figure 10:
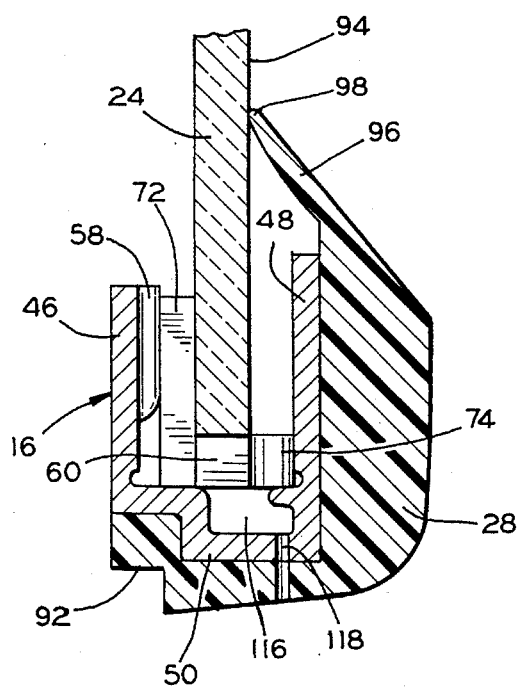
FIG. 10 is an enlarged sectional side view of the bottom bracket showing the gasket, sliding window, and window guide in the closed position.

FIGS. 8–10 show the positioning of the guides 60 in brackets 16, 18, and the engagement of the gasket lip 96 and the outer surface 94 of the sliding window 24. The lip 96 formed on the bottom and top 28, 30 segments of gasket 26 is the same configuration as the lip 96 on the vertical segments 36, 38 of the gasket 26.

The guide 60 engages the outer wall 48, 54 and inner wall 46, 52 of the respective channels 42, 44. When the sliding window 24 is closed, the guide 60 engages the cam 58 to urge the window 24 towards the lip 96 to compress the spring arm 66 and increase the seal between the lip 96 and the window 24.

When the sliding window 24 is open, the guide 60 does not engage the cam 58 and the spring arm 66 is only partially compressed to maintain the guide 60 in tension in the channels 42, 44. Such tension minimizes any vibration or rattles as the vehicle is being driven. The tension force is transverse to the sliding path of the window 24. Consequently, the spring tension of the guides 60 does not restrict the sliding of the window 24 or increase the sliding force required to slide the sliding window 24.

As the force of the sliding window 24 against the lip 96 increases to increase the integrity of the seal, the force required to slide the window 24 also increases. Consequently, the cam 58 is positioned such that the extra force to seal the aperture is applied only after the leading edge 104 of the sliding window 24 has cleared the lip 96 of vertical gasket segment 38 as the window 24 is being closed. As a result, the extra force is added only at the point of closing.

When the window is opened and the guide 60 disengages the cam 58, the spring arm 66 pushes the sliding window 24 away from the lip 96 to reduce the force needed to slide the window 24 along the range of open positions.

Figure 10A:
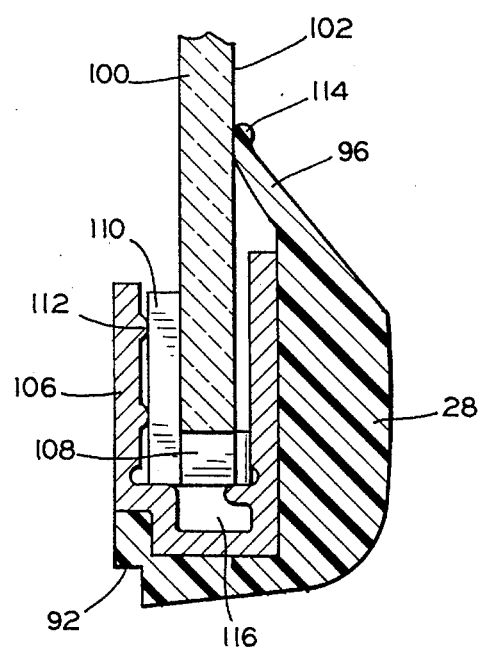
FIG. 10A is enlarged sectional side view of a bottom bracket showing an alternative embodiment having a different lip configuration on the gasket, a narrower bracket, and modified window guide in the closed position.

The design parameters effecting the sealing forces and the sliding forces, such as spring force of the guide, the width of the channels, and the length and shape of the lip, can be adjusted to achieve the desired sealing and sliding performance characteristics using the single gasket formed by a single reaction injection molding process. FIGS. 10 and 10A show two configurations of the bottom bracket 16. FIG. 10 is the cam 58, guide 60 and lip 96 shown in FIGS. 4–9. In FIG. 10A, the bracket 106 has a narrower channel 108 and a guide 110 with no or very little spring. The cams 112 have been significantly reduces in size. The overall tighter fit of the sliding window 100 in the channel 108 may reduce rattles and provide a tighter seal, but the required force for sliding the window is increased.

In order to reduce the sliding force, the tip 114 of the lip 96 had been rounded. A lubricant can be added to the lip 96 or the outer surface 102 of the window 100 to reduce the required sliding force to open the window 100. Various coatings may be applied to outer surface 102 of window 100 or the lip 96 in a standard production process. Silicon based coatings and other slip coatings are known in the art.

As shown in FIG. 10, the bottom bracket 16 includes a drain provision 116 for directing any water to a plurality of miniature weep holes 118 in the drain 116. Because the present invention does not require a rubber gasket or other full length guide in the channel 42, the weep holes 118 can be positioned at appropriate intervals and can be make significantly smaller to reduce wind noise which can occur at the drain holes.

Figure 11:
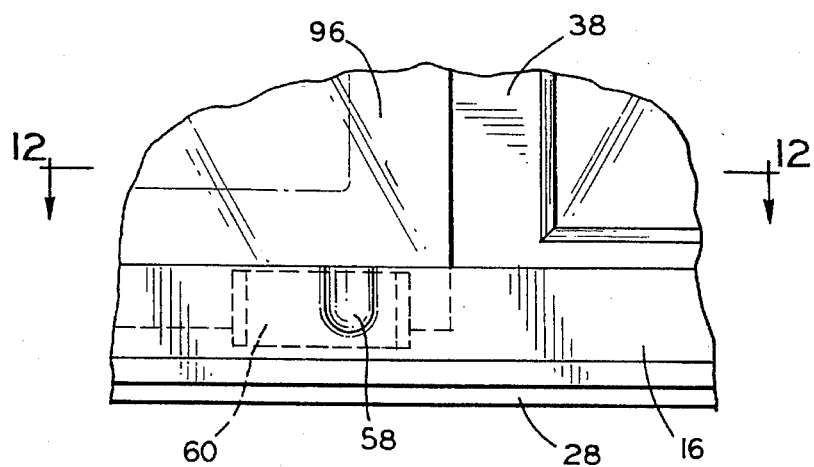
FIG. 11 is a fragmentary view of the bottom bracket showing the positioning of the cam and the window guide when the sliding window is in a closed position.
Figure 12:
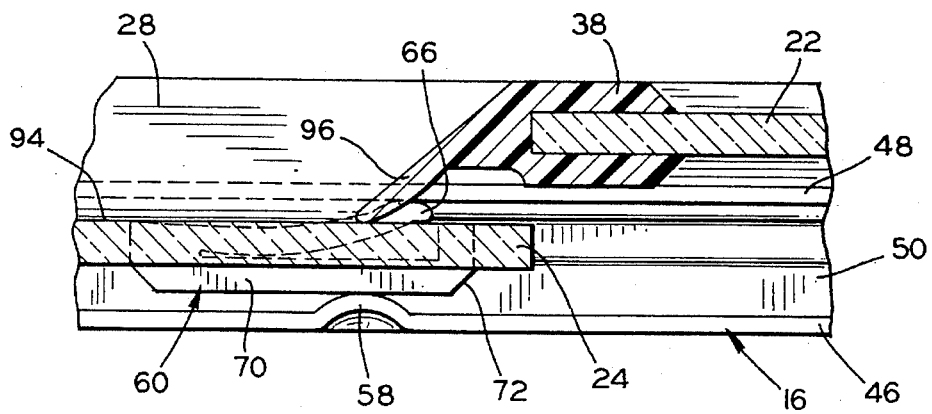
FIG. 12 is top plan view of the bottom bracket fragment in FIG. 11 taken along the line 12—12 thereof.
Figure 13:
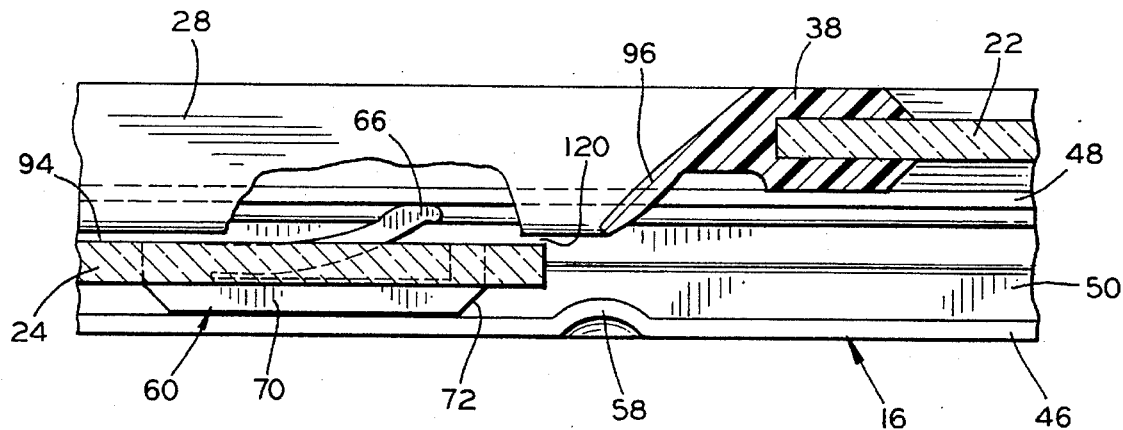
FIG. 13 is the top plan view of the bottom bracket shown in FIG. 11 after the sliding window has been moved to an open position.

In FIGS. 11–13, the impact of the cam action at the closing point is shown in greater detail. The single, RIM encapsulated gasket segment 38 of gasket 26 is secured about fixed window 22. The actuator surface 70 engages the cam 58 to compress the spring arm 66 when the window 24 is closed. The lip 96 of both the vertical gasket segment 38 and the bottom gasket segment 28 engages the outer surface 94 of the window 24. When the window is opened and the actuator surface 70 clears the cam 58, the spring arm 66 forces the window away from the lip 96 to reduce the frictional force of the window 24 sliding against the lip 96. The spring effect is highlighted in FIG. 13 by showing a slight gap 120 along the outer surface 94 of the window 24. In actual operation, the window 24 will remain in contact with the lip 96, but with substantially less engagement force in the open position.

Figure 14:
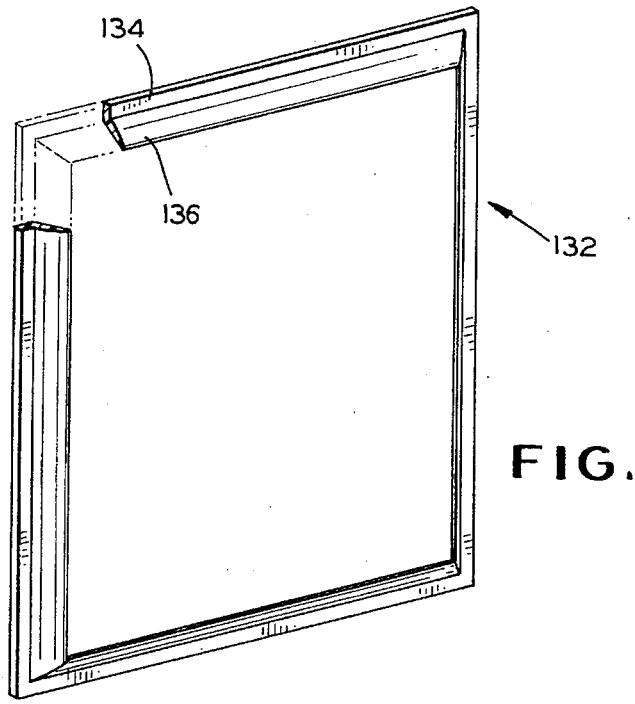
FIG. 14 shows a discrete sealing member, such as a rubber seal, which is secured about the aperture in the backlite window assembly in an additional embodiment.
Figures 15, 16:
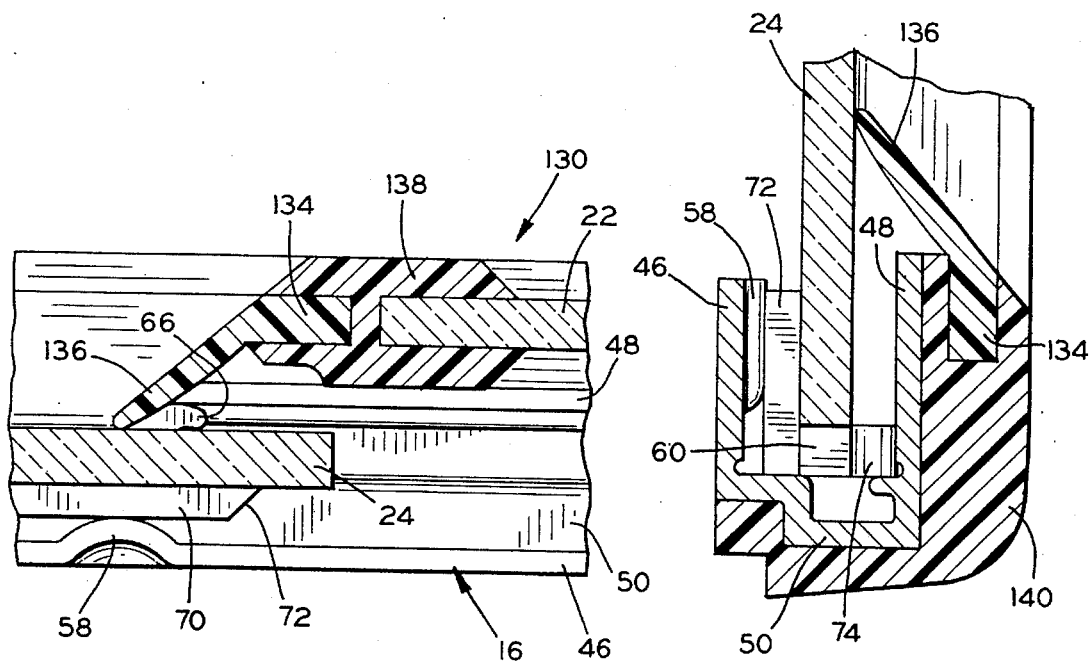
FIG. 15 is a top plan view of the bottom bracket fragment of a window assembly which includes the discrete sealing member shown in FIG. 14, and shows the positioning of the rubber seal when the aperture is closed.
FIG. 16 is a sectional side view of the bottom bracket of the window assembly with discrete sealing member, FIG. 16 showing the gasket, the sealing member, sliding window, and window guide in the closed position.

Some vehicle manufacturers still prefer a discrete rubber gasket for sealably engaging the sliding window in a backlite window assembly. FIGS. 14–16 show an additional embodiment having a discrete sealing member 132 for inclusion in a assembly 130 (shown only in fragmentary views of FIGS. 15–16). The brackets 16, 18; the fixed windows 20, 22; the sliding window 24; and the brackets 60 shown in assembly 14 and assembly 130 are identical and the same reference numbers are used in both embodiments. The primary differences between the first and second embodiments are the addition of a discrete sealing member 132 and a change in the configuration of the gasket 138, 140 about the aperture in the assembly 130 in the second embodiment.

The sealing member 132 is typically made from rubber or other similar sealing material. The sealing member includes a body portion 134 and an extended lip 136. The extended lip 136 is similar in function to the lip 96 formed by the encapsulated gasket of window assembly 14.

In window assembly 130, the reaction injection molding process includes the proper positioning of the sealing member 132 in the mold. The sealing member 132 defines the aperture in window assembly 130.

The encapsulated gasket is formed in a single reaction injection molding encapsulation operation. The resulting gasket is a one-piece gasket formed about the periphery of the window assembly 130 and the aperture between the fixed windows 20, 22. The one-piece formation provides a unitary gasket which significantly reduces leakage problems.

The main difference between the gasket in the second embodiment and the gasket in the first embodiment is in the segments around the aperture between the fixed windows 20, 22. The gasket includes a vertical segment 138 to sealably join the sealing member 132 and the fixed windows 20, 22. The horizontal segments 140 of the gasket sealably join the sealing member 132 to the brackets 16, 18.

The reaction injection molding encapsulation process eliminates the need for a two channel bracket and improves the seal about the aperture.

In addition to the reaction injection molding process for forming a polyurethane gasket, other molding processes and materials can be used to form the gasket. An elastic polyvinyl chloride material could be used to form a gasket for the window assembly of the present invention.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A window assembly provided with a sliding window for opening and closing an aperture in the window assembly, said assembly comprising:

a pair of windows in planar, laterally-spaced-apart relationship, each window having an inner surface, an outer surface, and a peripheral edge;

a pair of channel brackets adjacent the inner surface of said pair of windows, said brackets positioned in parallel, spaced-apart relationship and including a top bracket having a longitudinal channel extending along a top edge of said pair of windows, and a bottom bracket having a longitudinal channel extending along a bottom edge of said pair of windows;

a gasket integrally formed about the peripheral edge of each window and adhering to an outer surface of the top and bottom channel brackets for securing said pair of windows to said pair of channel brackets, said gasket defining a periphery of said window assembly and a generally rectangular aperture intermediate said pair of windows in said window assembly;

a sealing lip integrally formed in said gasket about the periphery of the rectangular aperture in the window assembly; and a sliding window positioned in the channels of said channel brackets for closing and opening the aperture in the window assembly, said sliding window including an outer surface for engaging said sealing lip to seal the aperture in the window assembly when said sliding window is in a closed position.

2. The window assembly defined in claim 1 including at least one channel guide mounted on a top edge of said sliding window and at least one channel guide mounted on a bottom edge of said sliding window, said channel guides positioned in the channels of said brackets and including a spring means for engaging an inside wall and an outside wall of the channels for maintaining said sliding window in tension in the channels and in engagement against said sealing lip.

3. The window assembly defined in claim 2 wherein the channel in said brackets includes at least one cam formed in the inner wall of the channel for engaging the channel guide when said sliding window is in the closed position, said cam urging the channel guide against the outside wall to compress the spring means and force said sliding window against said sealing lip to increase the pressure of the seal about the aperture.

4. The window assembly defined in claim 2 wherein said sealing lip includes a surface lubricant to facilitate the sliding of the sliding window in said channel brackets while maintaining the seal about the aperture.

5. The window assembly defined in claim 2 wherein said sliding window includes a surface lubricant on the outer surface of said sliding window to facilitate the sliding of the sliding window in said channel brackets while maintaining the seal about the aperture.

6. The window assembly defined in claim 1 wherein said gasket is composed of a synthetic polymer, said gasket having been polymerized in situ adjacent said windows and said channel brackets through reaction injection molding to form a single integral gasket.

7. The window assembly defined in claim 6 wherein said gasket is formed of an elastomeric material.

8. The window assembly defined in claim 7 wherein said elastomeric material is a polyurethane material.

9. The window assembly defined in claim 1 wherein said gasket is composed of a polyvinyl chloride material, said gasket being injection molded to form a single integral gasket.

10. The window assembly defined in claim 1 wherein the bottom bracket includes at least one weep hole in the channel.

11. The window assembly defined in claim 1 including a latching means mounted on a vertical edge of said sliding window for engaging a complementary latching means mounted on one of said pair of windows.

12. The window assembly defined in claim 11 wherein said latching means includes a lever arm for closing said sliding window to sealably engage said sealing lip.

13. A window assembly provided with a sliding window for opening and closing an aperture in the window assembly, said assembly comprising:

a pair of windows in planar, laterally-spaced-apart relationship, each window having an inner surface, an outer surface, and a peripheral edge;

a pair of channel brackets adjacent the inner surface of said pair of windows, said brackets positioned in parallel, spaced-apart relationship and including a top bracket having a longitudinal channel extending along a top edge of said pair of windows, and a bottom bracket having a longitudinal channel extending along a bottom edge of said pair of windows;

at least one cam formed in each of the channel brackets;

a gasket integrally formed about the peripheral edge of each window and adhering to an outer surface of the top and bottom channel brackets for securing said pair of windows to said pair of channel brackets, said gasket defining a periphery of a window assembly and a generally rectangular aperture in the window assembly;

a sealing lip integrally formed in said gasket about the periphery of the rectangular aperture in the window assembly;

a sliding window positioned in the channels of said channel brackets for closing and opening the aperture in the window assembly, said sliding window including an outer surface for engaging said sealing lip; and at least one channel guide mounted on a top edge of said sliding window and at least one channel guide mounted on a bottom edge of said sliding window, said channel guides positioned in the channels of said brackets and including a spring means for engaging an inside wall and an outside wall of the channel for maintaining said sliding window in tension in the channel, said channel guide engaging said cam when said sliding window is in the closed position, said cam urging the channel guide against the outside wall to compress the spring means and force said sliding window against said sealing lip to increase the pressure of the seal about the aperture.

14. The window assembly defined in claim 13 wherein said channel guide includes two spaced-apart channel guides on the top and bottom edges of said sliding glass, said channel guides including a spring arm.

15. The window assembly defined in claim 13 including a latching means mounted on a vertical edge of said sliding window for engaging a complementary latching means mounted on one of said pair of windows.

16. A window assembly provided with a sliding window for opening and closing an aperture in the window assembly, said assembly comprising:

a pair of windows in planar, laterally-spaced-apart relationship, each window having an inner surface, an outer surface, and a peripheral edge;

a pair of channel brackets adjacent the inner surface of said pair of windows, said brackets positioned in parallel, spaced-apart relationship and including a top bracket having a longitudinal channel extending along a top edge of said pair of windows, and a bottom bracket having a longitudinal channel extending along a bottom edge of said pair of windows;

a sealing member defining a rectangular aperture, said sealing member positioned in generally planar relationship between said pair of windows and having a sealing strip extending about a periphery of said sealing member, said sealing strip provided with an inward protruding lip extending about the periphery of the rectangular aperture;

a gasket integrally formed about and adhering to the peripheral edge of each window, the periphery of the sealing member, and an outer surface of the top and bottom channel brackets for securing said pair of windows, said pair of channel brackets, and said sealing member as an integral window assembly having a rectangular aperture, said gasket defining a periphery of the window assembly; and a sliding window positioned in the channels of said channel brackets for closing and opening the aperture in the window assembly, said sliding window including an outer surface engaging the lip of said sealing member to seal the aperture in the window assembly when said sliding window is in a closed position.

17. The window assembly defined in claim 16 including at least one channel guide mounted on a top edge of said sliding window and at least one channel guide mounted on a bottom edge of said sliding window, said channel guides positioned in the channels of said brackets and including a spring means for engaging an inside wall and an outside wall of the channels for maintaining said sliding window in tension in the channels and in engagement against the lip of said sealing member.

18. The window assembly defined in claim 17 wherein the channel in said brackets includes at least one cam formed in the inner wall of the channel for engaging the channel guide when said sliding window is in the closed position, said cam urging the channel guide against the outside wall to compress the spring means and force said sliding window against the lip of said sealing member to increase the pressure of the seal about the aperture.

* * * * *